E. BROWN.
TOOTHED WHEEL.
APPLICATION FILED MAR. 9, 1917.
1,383,266.
Patented June 28, 1921.
2 SHEETS—SHEET 2.
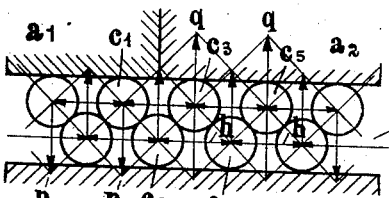
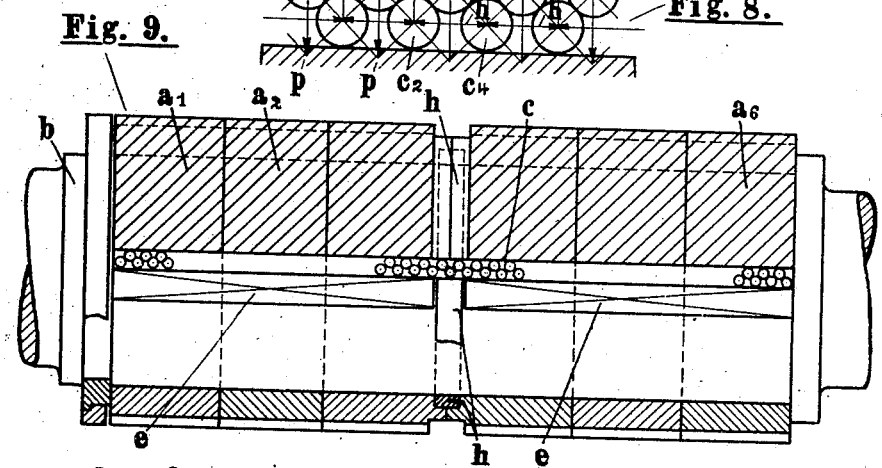
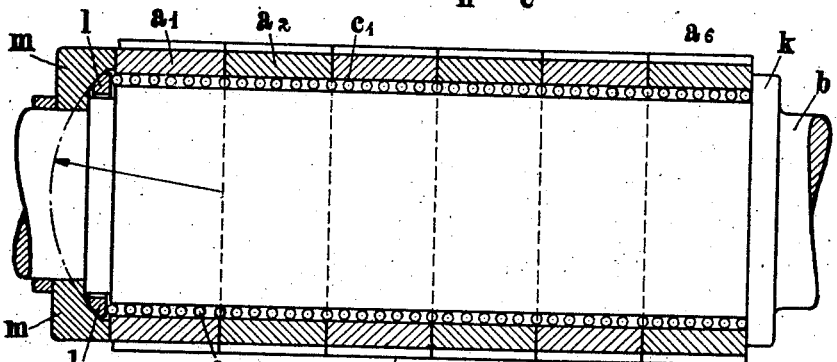
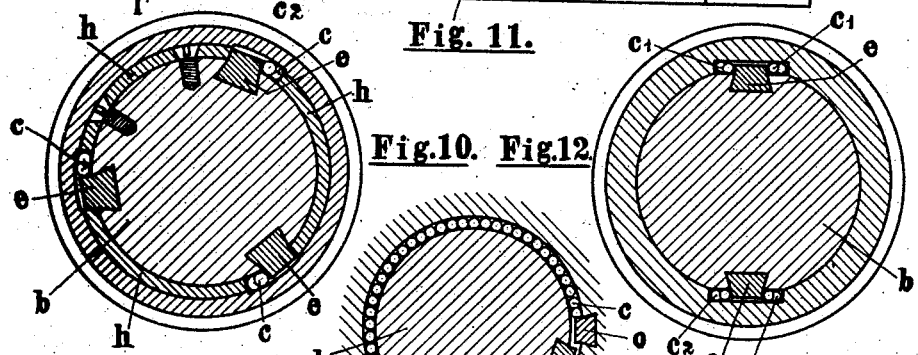
Inventor
Eric Brown
by
Attorney

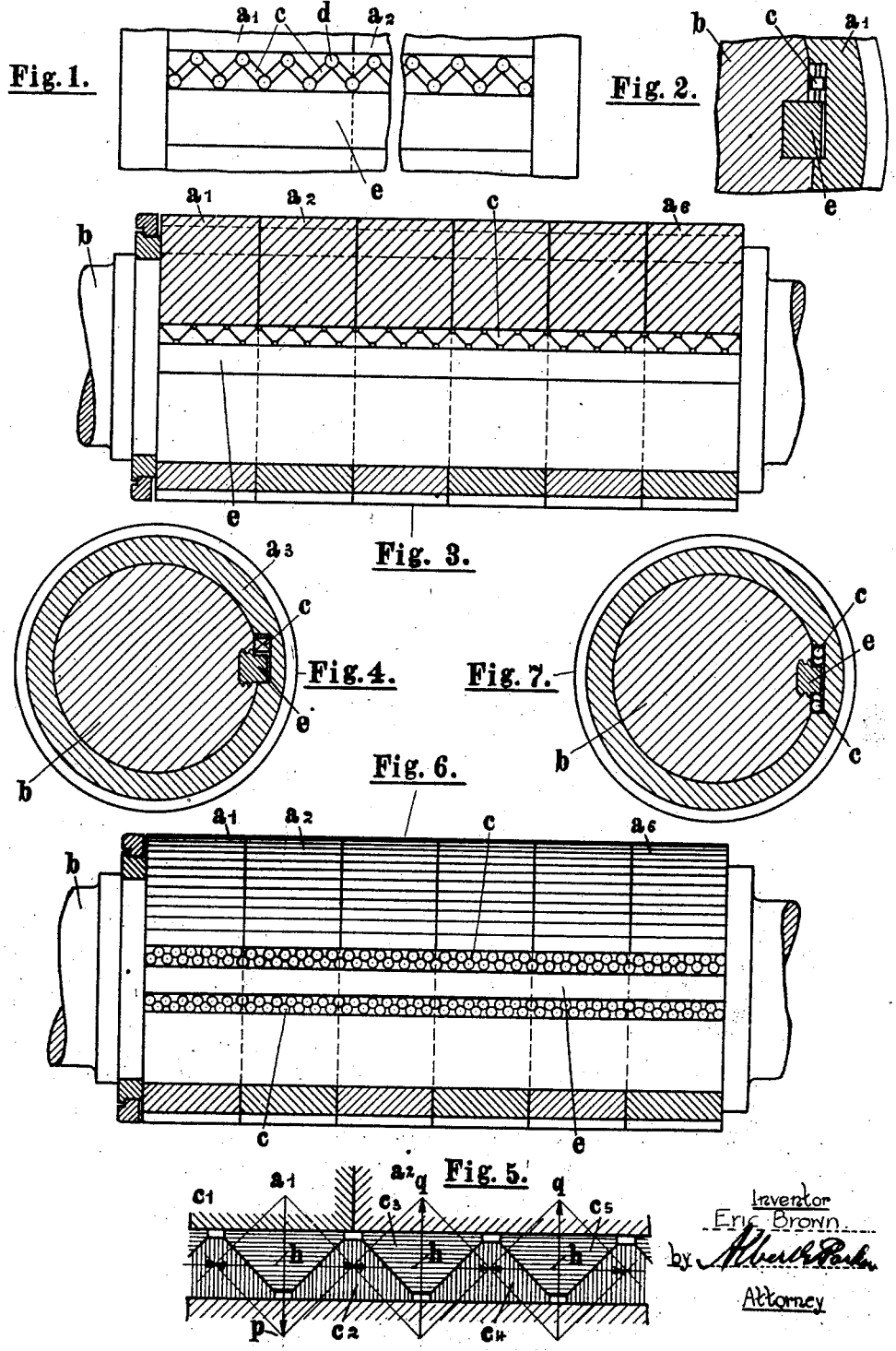

UNITED STATES PATENT OFFICE.

ERIC BROWN, OF BADEN, SWITZERLAND, ASSIGNOR TO AKTIENGESELLSCHAFT BROWN BOVERIE & CIE., OF BADEN, SWITZERLAND.

TOOTHED WHEEL.

1,383,266.  Specification of Letters Patent.  Patented June 28, 1921.

Application filed March 9, 1917. Serial No. 153,757.

*To all whom it may concern:*

Be it known that I, ERIC BROWN, a subject of the King of Great Britain and Ireland, residing at Baden, in the Republic of Switzerland, have invented certain new and useful Improvements in Toothed Wheels, of which the following is a specification.

The highly developed art of the methods of manufacture of toothed wheels has rendered it possible to construct toothed wheel gearing for extremely high powers.

Naturally the width of the teeth of such wheels must be made very great even when said width is distributed as in the case of double helical wheels. Errors as regards shape, pitch and parallel location of the teeth as well as of the wheel axes, which errors are very small and hardly measurable *per se*, and cannot be avoided even with the most perfected methods of manufacture, are liable to become extremely appreciable in the case of a large width of tooth. If we examine the conditions for perfect engagement and also for uniform lubrication over the whole width of the tooth with the aid of determined figures corresponding to actual practice, it will be found that it is not possible to avoid irregularities in the dimensions of the teeth even in the case of most careful machining, and that in consequence of the great width of gear there is the danger of a one-sided loading of the teeth with consequent premature wear and liability to local gripping of the teeth. Even slight differences of temperature between a pinion and its wheel, such as readily occur in consequence of the very different conditions for the generation and conduction of heat in the two cases, are sufficient to give rise to such danger. Take for instance a pinion having a breadth of tooth of 600 mm. making six to seven times more revolutions than the corresponding wheel, which is a case such as may occur in marine practice, after a protracted period of working it may easily happen that the pinion acquires a 10° centigrade higher temperature than the wheel.

If now the teeth of a helical pinion acquire an error in axial pitch of only a hundredth millimeter per degree and meter, then since the thermal expansion for 600 mm. will amount to six hundredths of a millimeter for a difference of temperature of 10°, the error in the pitch over the entire breadth of the teeth of the pinion will amount from this cause to six hundredths of a millimeter. Now since the thickness of a film of oil for transmitting the pressure of the tooth such as may occur in this case, cannot amount to more than a hundredth of a millimeter, the teeth of the pinion will come into operation along only a small part of the breadth, and will therefore become locally overloaded so that the film of oil between the teeth will be completely squeezed out and abrasion set up by metallic contact.

In addition irregularities in the dimensions of the teeth such as are unavoidable even with the most perfect process of manufacture, and such as can scarcely be determined with the most delicate means of measuring, are multiplied by the abnormal width of the teeth to such a degree that even with the most perfected methods of manufacture of the teeth of gearing necessary for very high powers, it is impossible to avoid certain drawbacks such as the risk of premature wear and undesirable noise.

It has been proposed to avoid the injurious influence of the width of the gearing on axial distribution of tooth pressure by so mounting the wheels that they acquire relative freedom of motion in radial or tangential directions, further to subdivide the wheels in cylindrical sections which are brought to bear by oil pressure and are limited in relative motion by stops.

But these means do not solve the problem of a self-contained distribution of the pressure along the breadth of the gear.

This object is effected according to the present invention, by subdividing toothed wheels into cylindrical sections, and stressing these sections relatively to one another and to the shaft, in such a manner that an increased tooth pressure occurring at one part of the teeth will act not alone upon the respective wheel section, but through the medium of the elements that effect the stressing without a limiting stop, also upon the adjacent wheel sections, so that the tooth pressure will be freely equalized and uniformly distributed over the entire width of the tooth. In order to enable this to take place, the elements that effect the stressing are arranged and mounted in such a manner that they can vary their relative positions within certain limits.

The shape, arrangement and mounting of the elements may be widely varied for this purpose. The drawings illustrate some constructional examples:—

Figure 1 is a longitudinal section, and

Fig. 2 is a cross-section of a construction wherein the stressing of the wheel sections $a^1$, $a^2$, relatively to each other and to the shaft $b$, is effected by means of rod-like elements $c$ which are arranged in series as in trussed work at a certain angle in continuous repetition in a zig-zag line, and carry at their ends connecting pieces $d$ which serve on the one hand as abutments for supporting them against the wheel body $a^1$ or $a^2$, and on the other hand against the key $e$ that is inserted in the shaft $b$. The elements $c$ may be pivotally connected together by means of the connecting pieces $d$, in the manner of the links of a chain, or they are arranged to bear freely with their ends against the pieces $d$.

Fig. 3 is an elevation partly in longitudinal section, and

Fig. 4 is a cross-section of a pinion (toothed wheel for working with a toothed wheel of larger diameter) comprising cylindrical sections $a^1$ $a^2$ to $a^6$ mounted upon the shaft $b$. These sections are stressed relatively to each other and to the key $e$ fitted in the shaft, by means of a series of triangular elements $c$ which bear with their bases alternately against the sections $a$ and against the key $e$, and bear against one another with their sides. The three edges of these elements are blunted or rounded so that they are able to slide with their sides over one another and are able thereby to move relatively to one another. The distribution of forces between these elements and their abutments with resolution into axially and tangentially directed components is indicated in Fig. 5, and the reference letters are marked for the case where the wheel section $a^1$ is subjected to a greater tooth pressure than the section $a^2$.

The elements $c^1$, $c^3$, $c^5$, bear with their bases against the wheel sections $a^1$, $a^2$, while the elements $c^2$, $c^4$ bear against the key in the shaft. The increased tooth pressure $p$ acting upon $c^1$ forces this element like a wedge between the two adjacent elements in the direction of the arrow in the figure, and thereby produces toward both sides components of forces acting in the axial direction. The components directed toward the wheel section $a^2$ produce a shifting or compression of the elements $c^2$, $c^4$, etc., that bear against the wheel section $a^2$, so that the elements $c^3$, $c^5$, etc., situated between these are forced by the wedge-action against the wheel section $a^2$ and exert upon the latter forces $q$ which increase its tooth pressure and thus effect an equalization of the tooth pressure between the elements $a^1$ and $a^2$.

As elements for the transmission of these forces there may be employed for instance also balls or any suitable rotational bodies, or a combination of such bodies with wedge-shaped elements which are arranged together in zig-zag series and are inclosed in the space formed between the key on the shaft and the nose on the wheel sections.

Fig. 6 is a longitudinal section of a modified construction of a pinion composed of six sections, and Fig. 7 is a cross-section thereof, wherein the corresponding parts are marked with the same letters of reference as in the preceding figures.

The forces and movements produced between the balls in the case where the wheel section $a^1$ has a greater tooth pressure than the wheel section $a^2$ is shown in Fig. 8. In this figure the references are the same as those of the corresponding parts and forces as in Fig. 5.

From Figs. 6 and 7 it will also be perceived in what manner toothed wheels are to be constructed according to this invention for use in gearings that are to serve to transmit power in both directions of rotation. The interposition of the stressing elements, in this case the balls $c$, takes place for this purpose on both sides of the key $e$.

Instead of a one-sided or two-sided stressing system with a single key in the shaft, a number of such systems may be arranged around the shaft. This arrangement has the result that the strain on the shaft and on the wheel sections is distributed uniformly over the entire periphery and also that the stressing elements are relieved of load.

In order to effect a uniform distribution of the tooth pressure among the various groups of stressing elements in arrangements of this kind, special means must be taken to equalize the stressing forces also between the several groups. For this purpose there may be utilized the forces that act in the direction of the periphery of the wheel between the stressing elements.

A construction which effects this object is illustrated in Fig. 9 in longitudinal section, and in Fig. 10 in cross-section. In the shaft $b$ there are fitted at equal intervals three keys $e$ which are stressed on one side each by a system of balls $c$ with the wheel sections $a^1$, $a^2$ to $a^6$. The keys do not extend throughout the entire width of the wheel but are arranged in two parts. In the space left behind the two parts of each key there engage segmentally pieces $h$ which have been arranged around the shaft and which bear at their ends each against a ball system $c$. By this means a complete ring is formed which is composed alternately of segmental pieces $h$ and balls $c$, and it forms between the three stressing systems arranged along the axis, a transverse connection which equalizes the differences between the stresses that occur in them, By this means a uniform distribution of the forces for transmission between the shaft and the wheel sections is produced not only within one and the same stressing system, but also between the various systems. For the purpose of preventing a shifting of the transverse connection formed of the pieces $h$, one of these pieces may be fixed to the shaft for instance by means of screws.

Figs. 11 and 12 are respectively a longitudinal section and a cross-section of a construction wherein the forces acting in the direction of the axis in the stressing systems are utilized for effecting equalization between two systems acting each toward both sides. In this construction the shaft $b$ has fitted into it two keys $e$ which are arranged diametrally opposite each other and against which there abut on both sides respectively systems of balls $c^1$ and $c^2$. At one end of the wheel body the axial components of the stressing forces that are transmitted by these systems of balls, are taken as shown in Fig. 11, by a fixed collar $k$ on the shaft. At the other end these forces in both systems are brought into mutual reaction by the fact that the balls bear against a ring $l$ encircling the shaft, the outer limiting surface of which ring is spherical and bears against a correspondingly shaped inner surface of a cap $m$ which is mounted upon the shaft so as to serve as an abutment. When the stressing forces are greater, for instance in the system $c^1$ than in the system $c^2$, then the ring $l$ will be shifted along the spherical surface of $m$ in such a manner that the excess of the stressing forces existing in the system $c^1$ will be transferred to the system $c^2$ and in this manner produce equalization between the forces of the two systems.

The constructional subdivision of wheels into sections, and the stressing of these sections relatively to one another and to the shaft according to the present invention, may be applied also to gears for very high powers, such as for instance for marine propulsion, as well as to gears of medium and small dimensions. The subdivision may be limited to one constituent of the gear, for instance to the double helical pinion (Fig. 14), or may be applied to both constituents, that is to say, to both the pinion and its wheel. In the latter case the sections of the one constituent may be staggered relatively to the sections of the other constituent. The planes of section that limit the wheel sections, may also be arranged obliquely to the axis in order to distribute over different parts of the tooth of the engaging wheel the difference in wear caused by the line of section. In order to lubricate the bearing surfaces of the stressing elements where they come in contact with each other, as well as with the shaft and the wheel sections, holes may be bored in all parts of the construction to provide for an abundant supply of lubricating oil.

In the case of small pinions, a simplified arrangement may be employed which consists in arranging stressing elements, for instance balls, over the entire periphery of the shaft, so that these elements or balls serve at the same time for centering the wheel sections. An arrangement of this kind is indicated in Fig. 13. The key $e$ is fitted into the shaft $b$. It serves as an abutment for the balls which are spread out in this arrangement over the entire periphery of the shaft and over the entire width of the wheel in the form of a continuous net. These balls have an abutment against the keys $o$ that are fitted into the wheel sections.

A construction for equalizing the tooth pressure according to the present invention may be employed with great advantage in the case of stepped spur wheels. In wheels of this kind it is not practically possible to adjust keys of the several steps with such exactness as to insure that all the steps will take an equal share in the tooth pressure. If, however, a wheel of such a gearing be provided with an apparatus for equalizing the tooth pressure between the several steps, then all the steps of the gearing wheel take an equal share in transmitting the total torque.

Having described my invention what I claim is:—

1. In combination a toothed wheel divided into similar cylindrical sections, loosely mounted upon a shaft between projections or recesses thereon, a longitudinal key secured in a groove in such shaft extending beyond the periphery of same; each of said sections having a recess for contacting with said key, and a series of triangular elements arranged with their angular faces in contact, their bases bearing alternately against the longitudinal key and one wall of the recess in one of the toothed wheel sections with their angular sides in contact with each other, there being a space at the apex of each element to allow the free movement of each element when stressed in one direction, substantially as described.

2. In combination a shaft with a keyway therein, a key fitted in said keyway, a plurality of toothed wheel sections mounted on said shaft with recesses in each of said wheels larger than the width of the key and rigid members capable of relative movement connecting said key and said wheel sections.

3. In combination a shaft, a projection extending longitudinally of said shaft and beyond the periphery thereof, toothed wheel sections mounted on said shaft with recesses in each of said wheels larger than the width of the projection and rigid members capable of relative movement connecting said projection and said wheel sections.

4. In combination a shaft with a keyway therein, a key fitted in said keyway, a plurality of toothed wheel sections mounted on said shaft with recesses in each of said wheels larger than the width of the key and bodies of substantially triangular section connecting said key and said wheel sections.

5. In combination a shaft with keyways therein, a plurality of keys fitted in said keyways, a plurality of toothed wheel sections mounted on said shaft with recesses in each of said wheels larger than the width of the keys and rigid members capable of relative movement connecting said keys and said wheel sections.

6. In combination a shaft with keyways therein, a plurality of keys fitted in said keyways, a plurality of segments disposed about the shaft and between the keys, toothed wheel sections mounted on said segments with recesses in each of said wheels larger than the width of the keys and rigid members capable of relative movement connecting said keys and said wheel sections.

7. In combination a shaft with a keyway therein, a key fitted in said keyway, a plurality of toothed wheel sections mounted on said shaft with recesses in each of said wheels larger than the width of the key and rigid members capable of relative movement connecting said key and said wheel sections, together with a spherical seated ring and coöperating housing at one end of said shaft.

8. In combination a shaft, a plurality of toothed wheels disposed about said shaft, a projection on one member adapted to come in contact with a part substantially integral with the other member and rigid members capable of relative movement connecting said projection and said other member.

In testimony whereof I have signed my name to this specification.

ERIC BROWN.